Jan. 16, 1962  R. D. INGERSOLL ET AL  3,016,648
MECHANICAL FISHING DEVICE
Filed June 25, 1958
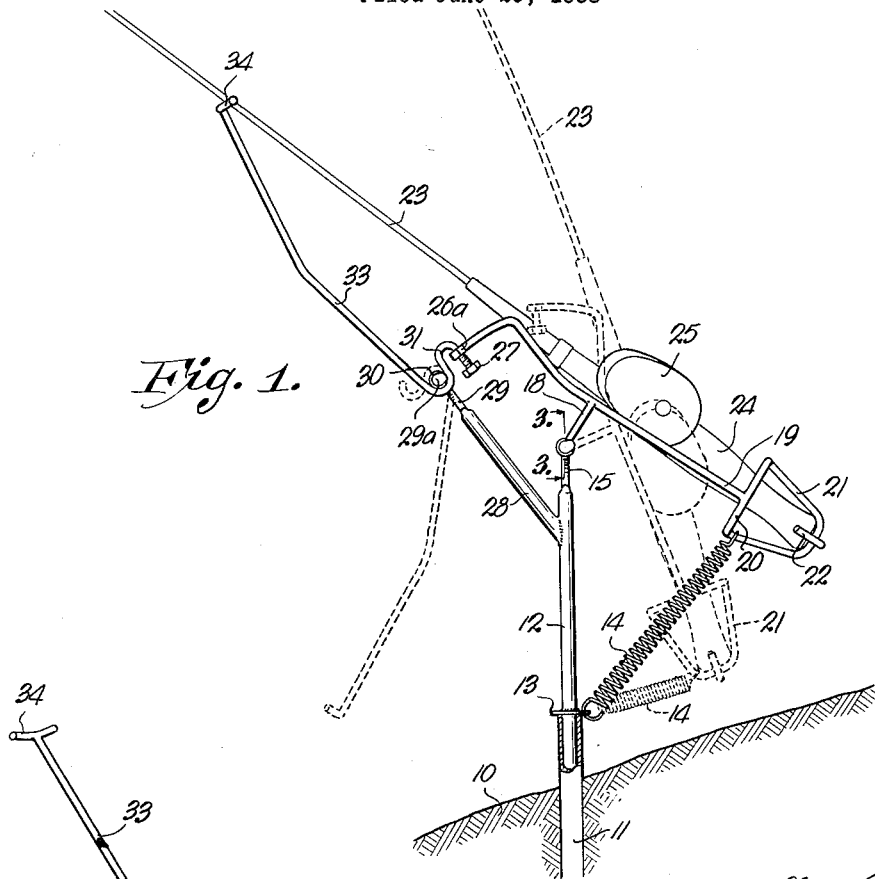
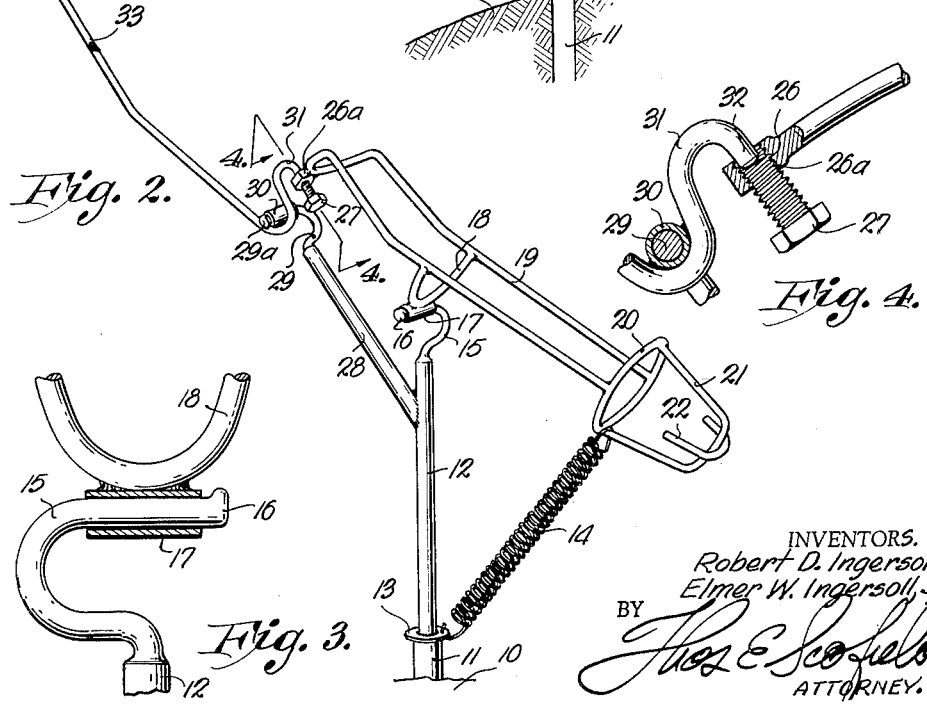
INVENTORS.
Robert D. Ingersoll
Elmer W. Ingersoll, Jr.
BY
ATTORNEY.

United States Patent Office 3,016,648
Patented Jan. 16, 1962

3,016,648
MECHANICAL FISHING DEVICE
Robert D. Ingersoll, 1028 E. Peoria, and Elmer W. Ingersoll, Jr., 205 W. Kaskaskia, both of Paola, Kans.
Filed June 25, 1958, Ser. No. 744,603
3 Claims. (Cl. 43—15)

This invention relates to automatic fish catching devices and refers more particularly to devices for supporting individual fishing rods which operate to snap the rod upwardly when a fish pulls on the line whereby to hook the fish.

An object of the invention is to provide an automatic fish catching device which is simple in construction, rugged, has a long life under hard and constant use, and is easy and cheap to manufacture.

Another object of the invention is to provide an automatic fish catching device which may be easily and quickly set up for operation either in the earth or on a boat, and which permits pivotal motion of the fishing rod after a fish is caught whereby to avoid a lateral pull on the device which might pull over its support.

Another object of the invention is to provide an automatic fish catching device wherein a pull on the line triggers the device so as to hook the fish, the sensitivity of the triggering device being easily and quickly variable, permitting adjustment to the fishing characteristics of any given locality.

Another object of the invention is to provide an automatic fish catching device which is easily installed for use, easily cocked and then easily re-cocked after a fish is caught.

Another object of the invention is to provide an automatic fishing device of very great simplicity which will yet securely hold a fishing rod and react with great sensitivity to a pull on the line.

Other and further objects of the invention will appear in the course of the following description thereof.

In the drawings, which form a part of the instant invention and are to be read in conjunction therewith, an embodiment of the invention is shown and, in the various views, like numerals are employed to indicate like parts.

FIG. 1 is a side view with parts broken away of the inventive automatic fish catching device, the device shown in cocked position in full lines and in released position in dotted lines.

FIG. 2 is a rear three-quarter perspective view of the inventive device shown in the cocked position.

FIG. 3 is a view taken along the lines 3—3 of FIG. 1 in the direction of the arrows.

FIG. 4 is a view taken along the lines 4—4 of FIG. 2 in the direction of the arrows.

Referring to the drawings, in FIG. 1, at 10 is shown the ground level. Hollow cylindrical tube 11 is inserted in the earth and is preferably sharpened (not shown) at its lower end for easier insertion in the ground. Rod 12 snugly yet slidably fits within tube 11 and has flange 13 fixed thereto intermediate the ends thereof. Flange 13 serves as a stop for rod 12 in its insertion into tube 11 and as the engagement for one end of resilient coil spring 14. U-arm 15 is continuously formed with or attached to the upper end of rod 12 and has enlarged portion 16 (FIG. 3) on the end thereof. Sleeve 17 fits over the free end of U-arm 15 and forms a pivotal mounting for a fishing pole receiving frame. The frame comprises U-arm 18 fixed to sleeve 17, forwardly inclined U-shaped member 19, closed ring 20, U-shaped member 21 attached to ring 20 and U-shaped member 22 attached to member 21. Coil spring 14 engages member 21 with the end thereof opposite that engaging flange 13. A fishing pole 23, having handle 24 and reel 25 thereon, is shown received in the frame in FIG. 1 with the handle end of the rod resting against member 21 and retained by member 22.

An internally threaded opening 26 is provided at the end of the frame opposite that engaged by the spring 14 and on the other side of the pivotal mounting of the frame therefrom. Member 27, externally threaded, screws thereinto to regulate the available depth thereof. In the modifications shown in the drawings, opening 26 is provided by a nut 26a fixedly attached to the front depressed loop of U-shaped member 19 and member 27 comprises a bolt insertable in the nut.

Secondary rod or arm 28 extends outwardly at an angle from arm 12 and has U-shaped end member 29 either formed integral therewith or fixedly attached thereto. Referring to FIG. 4, sleeve 30 is pivotally mounted on the member 29 which has an enlarged portion 29a thereon to prevent slipping off of the sleeve 30. S-shaped primary arm 31 is fixedly attached to sleeve 30 and pivots therewith around member 29. Arm 31 is so formed that the tip 32 thereof may be inserted into opening 26 when the frame is pivoted to the cocked position of FIG. 1. Secondary arm 33 is attached to or formed continuous with arm 31 and extends outwardly and upwardly when tip 32 engages opening 26 so as to receive rod 23 in V-shaped member 34 at the free end thereof. The V-shaped member 34, when the device is cocked, is above the level of the downwardly bent end loop of member 19 whereby V-shaped member 34 and loop 21 support the pole and its handle.

In operation, the externally threaded means 27 is so adjusted relative opening 26 that the tip 32 of arm 31 will be insertable therein to a depth commensurate with the sensitivity of trigger desired. The sensitivity desired will vary, depending upon the type of fish sought, the existence of a current in the water being fished, the weight of the pole, the attachments on the line, etc. Once member 27 is set to the desired depth opening, and tube 11 is inset in the ground with rod 12 positioned therein, the angler may then grasp member 21 with his hand and, pulling upwardly against the resilience of spring 14, move the opening 26 to a position where it is engageable with tip 32 upon rotation of arm 33 and sleeve 30 around member 29. When the trigger mechanism has thus been set, the rod may be inserted in the frame as shown in full lines in FIG. 1, with handle 24 received in member 21 and the rod itself received in V-shaped member 34. A suitable pull on the line will exert force on arm 33, thus tending to pivot arm 33 around member 29 and remove tip 32 from opening 26. The tension and strength of spring 14 also is a factor in the control of the sensitivity of the device. Sufficient pull on the line depresses lever arm 33, removes tip 32 from opening 26 and permits spring 14 to snap the frame clock-wise (in FIG. 1) to the dotted line position. Unless reel 25 maintains the rod at a fixed position relative member 19, the forward part of the rod, will then fall down into the downwardly bent loop of member 19 and rest thereagainst. Spring 14 provides a certain amount of resilience which plays the fish until the angler can remove it from the line. The snap action operates to set the hook in the fish. Too great a force applied, however, will drag the hook through the fish's mouth and, while damaging the fish, nevertheless releases it. Therefore, the latter must be a factor in the selection of a given tensioning spring for a given locality.

If the fisherman is fishing from a boat, the tube 11 which operates to give a swivel base, within which the rod 12 may rotate, can be inserted in an oarlock.

From the foregoing, it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all material hereinabove set forth or shown in the accompanying drawings is to be interpreted as illustrative and not in a limiting sense.

Having thus described our invention, we claim:

1. A mechanical fishing aid comprising a support adapted to be inserted in the ground, a fishing pole receiving frame pivotally mounted on the support so as to pivot between a cocked position and a released position, resilient means connected to the frame whereby to urge it toward the released position, the frame having an opening so formed therein that the pivotal mounting of the frame is between said opening and the connection of the resilient means to the frame, a member positioned in said opening and adjustable therein to vary the depth thereof, a trigger arm pivotally mounted on and relative to the support and adapted to be inserted in said opening to a variable depth limited by the position of the said member therein when the frame is in the cocked position, whereby to vary the sensitivity of the trigger, and means connected to said arm and extending so as to at least substantially contact a fishing pole supported by the frame when the latter is in the cocked position whereby a sufficient depression of the fishing pole will also sufficiently depress said contacting means and remove the arm from said opening whereby to permit movement of the frame under the action of the resilient means from the cocked to the released position, said trigger arm so formed that variations in the depth of said opening will not substantially vary the alignment of the rod contact means.

2. A mechanical fishing aid comprising a support adapted to be inserted in the ground, a fishing pole receiving frame pivotally mounted on the support so as to pivot between a cocked position and a released position, resilient means connecting the support and the frame whereby to urge the frame to the released position, a member having an internally threaded opening therein connected to said frame in such manner that the pivotal mounting of the frame is between it and the connection of the resilient means to said frame, an externally threaded member operable to screw in and out of said internally threaded opening whereby to vary the depth thereof, a primary arm pivotally mounted on and relative to said support and adapted to be inserted in said internally threaded opening to a depth limited by the position of the member therein when the frame is in the cocked position, and means connected to said arm and extending so as to at least substantially contact a fishing pole in the frame when the latter is in the cocked position whereby a sufficient depression of the pole will also sufficiently depress said contact means and remove said arm from the internally threaded opening whereby to permit movement of the frame from the cocked position to the released position under action of the resilient means.

3. A fishing aid as in claim 2 wherein the internally threaded member comprises a nut attached to the frame and the externally threaded member comprises a bolt adapted to threadedly engage said nut.

References Cited in the file of this patent

UNITED STATES PATENTS

| | | |
|---|---|---|
| 2,618,090 | Kimura | Nov. 18, 1952 |
| 2,661,563 | Adams et al. | Dec. 8, 1953 |
| 2,759,288 | Bratek | Aug. 21, 1956 |
| 2,770,906 | Hood | Nov. 20, 1956 |
| 2,804,277 | Kinder | Aug. 27, 1957 |
| 2,835,065 | Schwartzkopf | May 20, 1958 |
| 2,851,813 | Gugliotta | Sept. 16, 1958 |